United States Patent [19]

Van Sickle et al.

[11] Patent Number: 4,622,871

[45] Date of Patent: Nov. 18, 1986

[54] CUTTING TOOL COMPENSATOR FOR STATIONARY MACHINE TOOL

[75] Inventors: Richard G. Van Sickle, Sterling Heights; Gerald W. Mathie, Holly, both of Mich.

[73] Assignee: GTE Valeron Corporation, Troy, Mich.

[21] Appl. No.: 687,688

[22] Filed: Dec. 31, 1984

[51] Int. Cl.[4] .................................................. B23B 3/26
[52] U.S. Cl. ........................................ 82/1.2; 408/714; 408/180
[58] Field of Search .................. 408/161, 168, 180, 3, 408/154, 155, 156, 714; 409/233; 82/1.2, 2 E, 1.4, DIG. 9

[56] References Cited

U.S. PATENT DOCUMENTS

| 2,093,742 | 9/1937 | Staples | 408/156 |
| 3,486,412 | 12/1969 | Schraub et al. | 409/233 |
| 3,740,161 | 6/1973 | Milewski | 408/168 |
| 3,893,371 | 7/1975 | Frazier | 409/233 |
| 4,009,968 | 3/1977 | Vandenkieboom | 408/12 |
| 4,223,260 | 9/1980 | Beer et al. | 318/696 |
| 4,268,783 | 5/1981 | Murray | 318/632 |
| 4,416,569 | 11/1983 | Yamakage et al. | 408/168 |

FOREIGN PATENT DOCUMENTS

| 759981 | 2/1934 | France | 408/161 |
| 500416 | 11/1954 | Italy | 408/161 |
| 2040742 | 9/1980 | United Kingdom | 409/233 |
| 2122119 | 1/1984 | United Kingdom | 82/1.2 |
| 759243 | 8/1980 | U.S.S.R. | 408/180 |

*Primary Examiner*—John McQuade
*Attorney, Agent, or Firm*—Witherspoon & Hargest

[57] ABSTRACT

A machine tool of the type wherein a non-rotating cutting tool cuts a workpiece which rotates about a longitudinal axis of rotation. The machine tool includes a block member having the cutting tool attached thereto, the block member being coupled to a housing for radial movement of the block member and cutting tool in response to axial movement of a roller screw spindle internal of the housing.

20 Claims, 5 Drawing Figures

CUTTING TOOL COMPENSATOR FOR STATIONARY MACHINE TOOL

BACKGROUND OF THE INVENTION

1. Field of the Invention

The present invention is related to a machine tool of the type wherein a non-rotating cutting tool cuts a workpiece which rotates about a longitudinal axis of rotation. The machine tool has coupled thereto a cutting tool which is adjustable radially of the axis before, during or after the cutting operation depending on the work being done.

2. Description Of The Prior Art

Presently, parts can be machined to very close tolerances without the need for secondary operations such as honing, grinding and lapping.

Great improvements have been made in machine tools, particularly those tools which provide automatic adjustment for cutting tool inserts radially inward or outward, as and when desired, to, for example, compensate for wear of the cutting edge, for boring, turning, grooving, chamfering, finishing on a retract stroke, to withdraw the tool from a workpiece without marking the side wall of a finished bore, or for bore sizing and contour boring. One cutting machine which has provided significant advances in achieving these results is described in U.S. Pat. No. 3,740,161 and is made by GTE Valeron Corporation. The apparatus described in this patent includes a rotating cutting tool with cutting inserts coupled thereto and a stationary workpiece. With this tool, the cutting edges of all of the inserts can be automatically adjusted outwardly and inwardly precisely and quickly without human intervention and possible error, and downtime. However, this tool uses a hydraulic mechanism. A problem results from the fact that often state of the art cutting machines do not include hydraulic systems. With such machinery it is necessary to modify the basic cutting machine by supplementing it with an auxiliary hydraulic system. In addition to the fact that such an addition must be provided for, problems associated with the use of hydraulic apparatus are incurred. For example, hydraulic systems include various hydraulic pumps which tend to be noisy and also require attention in order to be maintained in acceptable operating condition. In addition, other hardware associated with a hydraulic system is required which adds to the cost and upkeep of such apparatus. In addition, it is not uncommon for hydraulic systems to operate continuously throughout the day even though the particular machine with which the system is associated may not be in use. Such continuous use obviously involves an unnecessary use of energy.

The addition of a hydraulic system also will require the addition of a control system to control the hydraulic equipment. Thus two systems will be required; one to control the cutting tool per se and one to control the hydraulic apparatus.

A further concern is that the actual control of the orientation or location of the cutting tool tends to be rather complicated when a hydraulic system is being used.

It is highly desirable to provide a machine tool which can be operated without an auxiliary system, particularly an auxiliary hydraulic system with all of the problems noted herein associated with such a system. It is also desirable to provide a machine tool wherein what is referred to in the art as a closed loop system may be utilized. In such a system, means are provided for orienting or locating the cutting tool in such a manner that simultaneously with such tool orientation signals are sent back to the orientation means to identify the cutting tool location and thereby facilitate proper positioning of the tool.

SUMMARY OF THE INVENTION

This invention achieves this and other results by providing a machine tool circumscribing a longitudinal axis of rotation and adapted for having coupled thereto at least one cutting tool which is adjustable radially of the axis. The machine tool is of the type wherein the cutting tool cuts a rotating workpiece. A housing is provided which circumscribes the axis. In a like manner, a block member is provided having a cavity therein which circumscribes the axis. The block member is coupled to the housing for radial movement relative to the housing and is adapted for having coupled thereto the cutting tool. The machine tool includes a drawbar which extends along the axis and is reciprocatably mounted in the housing and the cavity.

A roller screw is mounted within the housing. The roller screw includes a leadscrew spindle extending along the housing axis and at least one nut body operatively coupled thereto. The roller screw is mounted so that rotary motion of the nut body about the axis causes movement of the leadscrew spindle along the axis. Means are coupled to the nut body for controlled rotation thereof.

Means are provided coupled to the drawbar and to the leadscrew spindle for reciprocating the drawbar along the axis in response to movement of the leadscrew spindle along the axis.

Means are also provided operatively coupling the drawbar and the block member for causing the radial movement of the block member in response to reciprocation of the drawbar.

DESCRIPTION OF THE PREFERRED EMBODIMENT

The embodiment of this invention which is illustrated in FIGS. 1 to 5 is particularly suited for achieving the objects of this invention. FIGS. 1 to 4 depict a machine tool 2 circumscribing a longitudinal axis of rotation 4 and adapted for having coupled thereto in a known manner at least one cutting tool 6; shown only in FIG. 5, which is adjustable radially of the axis 4. The machine tool 2 is of the type wherein the cutting tool cuts a rotating workpiece.

Figure 5:
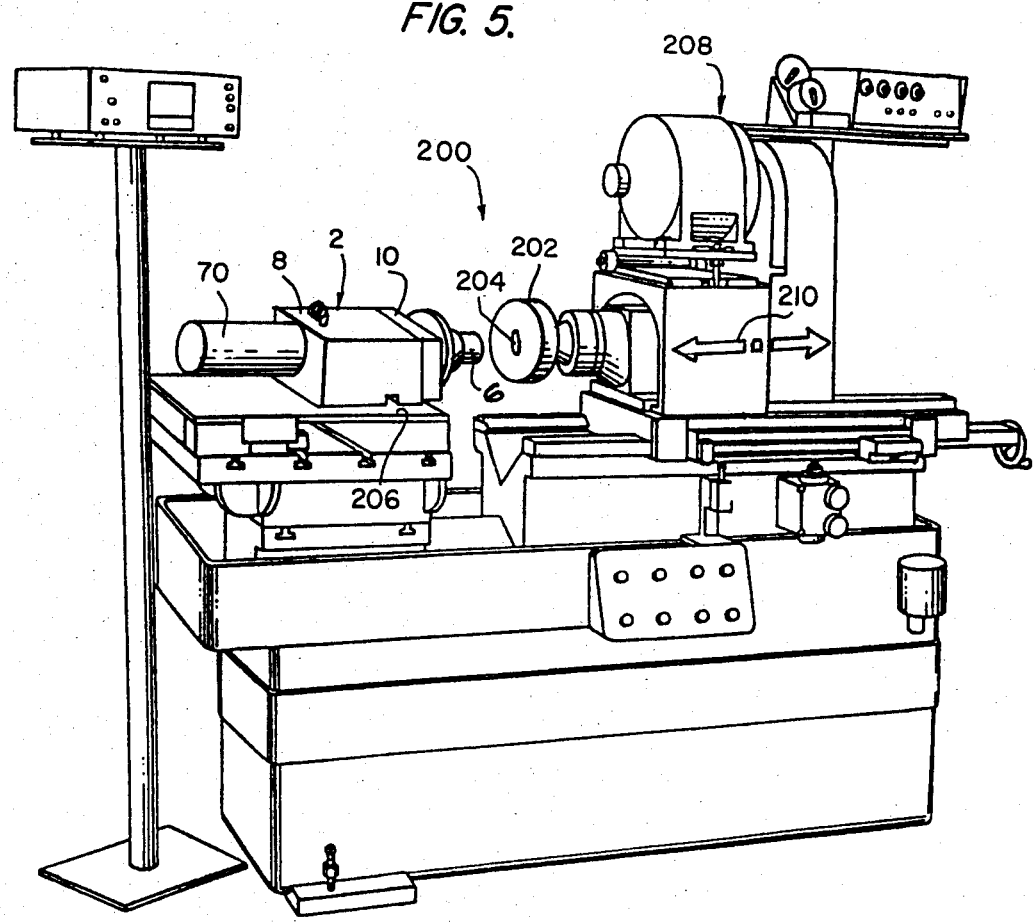
FIG. 5 is a view of a cutting machine including the machine tool of FIGS. 1 to 4.

The machine tool 2 includes a housing 8 which circumscribes the axis 4, and a block member 10, having a cavity 12 therein, which also circumscribes axis 4 and is coupled to housing 8 for radial movement relative to the axis 4. Block member 10 is adapted for having coupled thereto the cutting tool 6 as depicted in FIG. 5.

A drawbar 14 extends long axis 4 and is reciprocatably mounted within the housing 8 and cavity 12 of block member 10.

Figure 1:
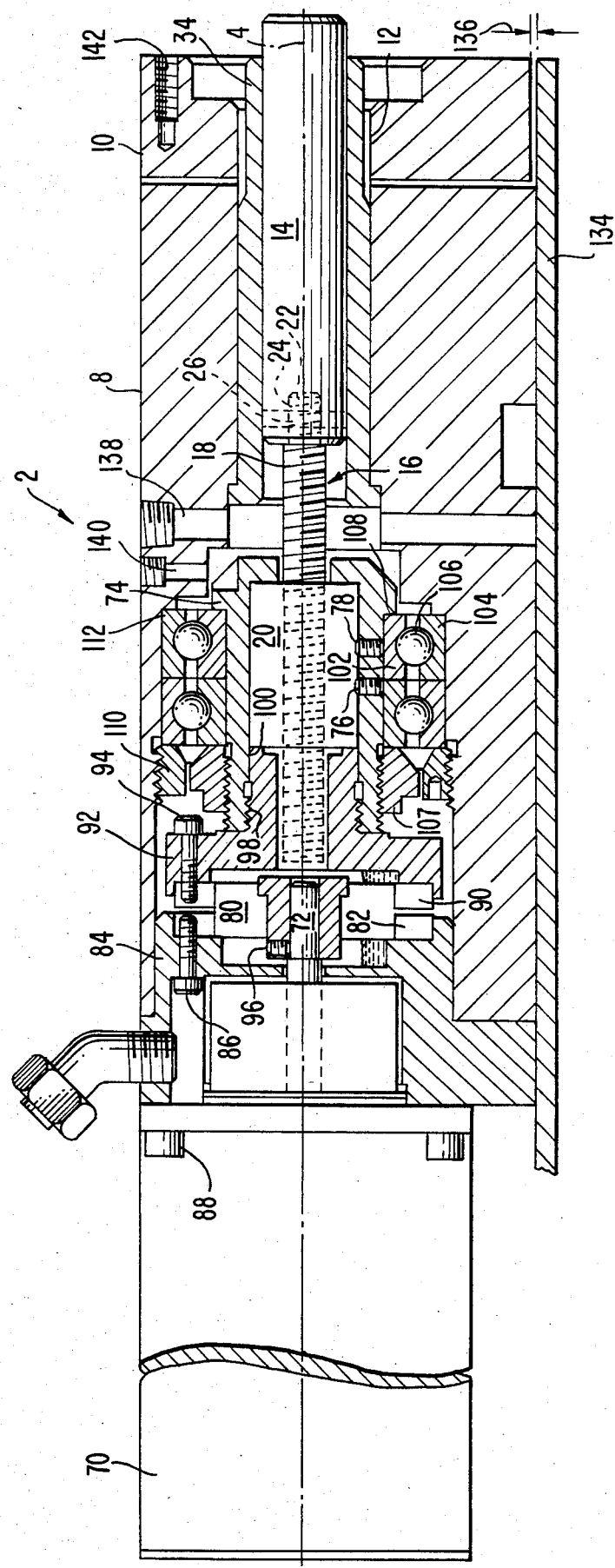
FIG. 1 is a sectional view of the machine tool of the present invention.

A roller screw 16 is also mounted within the housing 8. Roller screw 16 includes a leadscrew spindle 18 extending along axis 4. Also provided is at least one nut body operatively coupled to the leadscrew spindle. In FIG. 1, nut body 20 is operatively coupled to the leadscrew spindle 18 by inner and outer threads of the nut body and leadscrew spindle, respectively. The roller screw 16 is mounted within housing 8 such that rotary motion of the nut body 20 about axis 4 causes movement of the leadscrew spindle 18 along axis 4. Nut body 20 is depicted as including first and second nut portions with a spacer therebetween which serves to separate and preload the two nut portions.

The nut body 20 has coupled thereto means for controllably rotating the nut body as discussed in more detail hereinafter.

Means are provided for coupling the drawbar to the leadscrew spindle for reciprocating the drawbar along the axis in response to movement of the leadscrew spindle along the axis. For example, one end 22 of leadscrew spindle 18 is fitted in a recess 24 of the drawbar 14 and held in place by means of a pin 26 extending through the leadscrew spindle and drawbar.

Figure 2:
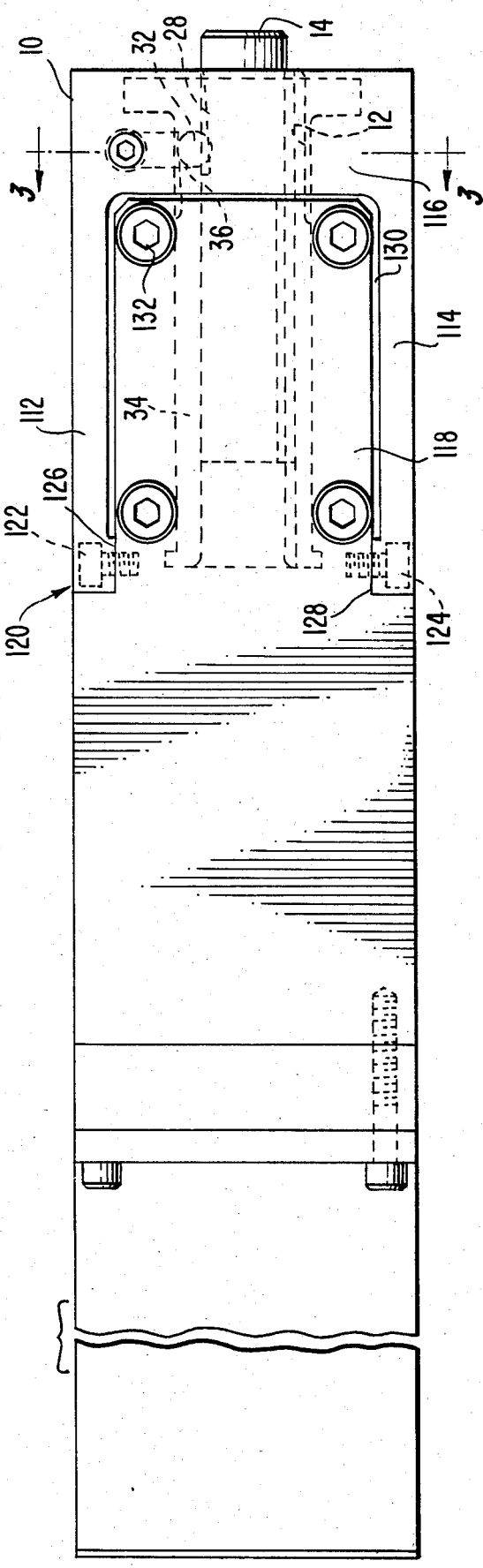
FIG. 2 is a plan view of FIG. 1.
Figure 4:
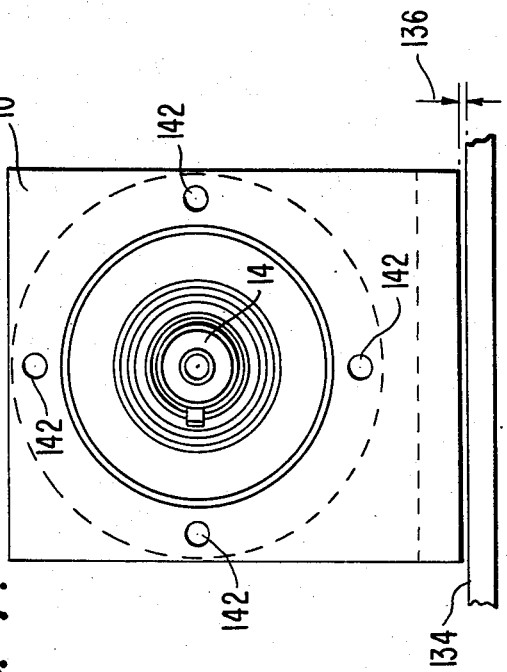
FIG. 4 is an end view of FIG. 1.
Figure 3:
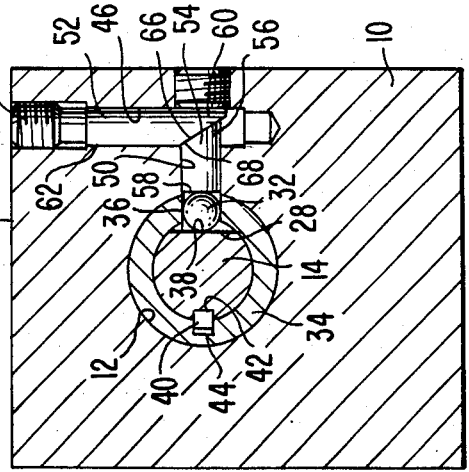
FIG. 3 is a view taken along line 3—3 of FIG. 2.

The drawbar 14 and block member 10 are operatively coupled by means for causing the radial movement of the block member in response to reciprocation of the drawbar. For example, such operatively coupling means is shown in FIGS. 2 and 3 as including a camming surface 28, on the portion 30 of the drawbar 14 which extends into cavity 12 of block member 10, and a cam follower extending between the block member and the camming surface. In FIGS. 2 and 3 the cam follower is a ball 32. In particular, a sleeve 34 is positioned internal of and extending between the housing 8 and the cavity 12. Drawbar 14 is positioned for reciprocation within sleeve 34. The sleeve includes an aperture 36 therethrough adjacent camming surface 28. Ball 32 extends from the block member 10 through aperture 36 and engages the camming surface 28 of drawbar 14 as best seen in FIG. 3. Preferably the ball 32 includes a flat segment 38 which engages the camming surface 28.

The machine tool also includes means coupled between the drawbar and sleeve for keying the drawbar relative to the sleeve. For example, FIG. 3 depicts a key 40 affixed within a recess 42 for aligning movement of the drawbar 14 relative to sleeve 34 as the key 40 moves along a keyway 44.

In the preferred embodiment the block member 10 includes a first bore 46 extending inwardly from an outer surface 48 and a second bore 50 extending outwardly from cavity 12. Bore 50 intersects bore 46 and is in alignment with aperture 36 as seen in FIG. 3. A first pin 52 extends within bore 46 and a second pin 54 extends within bore 50. The second pin 54 includes a first end 56 which extends into bore 46 and a second end 58 which engages ball 32. First pin 52 includes a first end 60 which engages the first end 56 of the second pin 54 and a second end 62. Means such as, for example, a set screw 64 extend into bore 46 and engage the second end 62 of the first pin 52 for urging the first pin 52 against the second pin 54. Preferably, the first end 60 of the first pin includes a first beveled surface 66 and the first end 56 of the second pin includes a second beveled surface 68, surface 66 engaging surface 68 as best seen in FIG. 3.

Machine tool 2 includes controllably rotating means such as a motor having a motor housing 70 and a motor shaft 72. Means are attached to the motor for operatively affixing the nut body 20 to the shaft. For example, a roll screw housing 74 contains the nut body 20 internal thereof. Nut body 20 is partially held in place by set screws 76 and 78. A harmonic drive member 80 includes a stationary portion 82 affixed to a housing member 84 by bolts 86, only one of which is shown. The housing member 84 is affixed to the motor housing 70 by bolts 88. The harmonic drive member 80 also includes a rotatable portion 90 affixed to a dynamic spline adapter 92 by bolts 94, only one of which is shown, and to motor shaft 72 by set screw 96. The adapter 92 is attached to roll screw housing 74 internal thereof by means of mating threads 98. The adapter 92 includes an end portion 100 which bears against nut body 20 and together with set screws 76 and 78 holds the nut body in place.

FIG. 1 depicts roll screw housing 74 internal of the machine tool housing 8 and spaced therefrom for rotation relative thereto by at least one bearing member. For example, FIG. 1 depicts bearings known in the art to comprise an inner race 102 and an outer race 104 having balls 106 therebetween. In such bearings, the balls 106 and race 102 rotate relative to race 104 to facilitate the rotation of the roll screw housing 74 and nut 20 coupled thereto relative to machine tool housing 8 and leadscrew spindle 18. Inner race 102 is held in place by a locknut 107 and a shoulder 108 of the roll screw housing. Outer race 104 is held in place by locknut 110 and a shoulder 112 of machine tool housing 8.

In the preferred embodiment the block member 10 is a U-shaped structure as depicted in FIG. 2 having a first wall 112 spaced from a second wall 114. The first and second walls are joined by a base 116. Machine tool housing 8 includes an end portion 118 which extends into the U-shaped structure between walls 112 and 114. The walls 112 and 114 are coupled to the end portion 118 at 120. In the embodiment depicted in the drawings the base 116 includes cavity 12, and the sleeve 34 is internal of and extends between the end portion 118 and base 116.

Preferably, block member 10 is coupled to housing 8 by means of bolts 122 and 124 which extend through walls 112 and 114, respectively, into opposite sides of the end portion 118 of housing 8 as shown in FIG. 2. Additional bolts, and dowel pins which also extend through walls 112 and 114 and into the opposite sides of the end portion 118 in a similar manner, are also used to firmly affix the block member to the housing at the interfaces identified by reference numerals 126 and 128. It will be noted that the block member 10 is spaced from the end portion 118 of the housing 8 at 130. In this manner the camming action between camming surface 28 and ball 32 causes the block member 10 to flex relative to the housing 8 as a result of the bending or flexing of the walls 112 and 114 in response to such camming action. In order to assure that the machine tool 2 is held firmly in place during the operation thereof, bolts 132 extend through the housing 8 and are affixed to the table or support surface 134 of the cutting machine. In order to assure that the block member 10 is free to pivot it is spaced from support surface 134 as at the space identified by arrows 136. Servicing internal of the housing 8 is facilitated by access bores 138 and 140.

In operation, rotation of motor shaft 72 causes rotation of the nut body 20 coupled thereto through the harmonic drive member 80, adapter 92 and roll screw housing 74. Rotation of the nut body 20 causes the leadscrew spindle 18 which is threadedly coupled to the nut body 20 to move relative thereto in an axial direction along axis 4. Since the leadscrew spindle 18 is coupled to the drawbar 14, movement of the leadscrew spindle causes corresponding movement of the drawbar along axis 4. Such movement of drawbar 14 causes a camming action between camming surface 28 and the ball 32 causing the block member 10 to flex in a radial direction relative to axis 4. In the embodiment depicted in FIG. 2, such movement of block member 10 will be upward or downward relative to axis 4. Such movement of the block member 10 will cause corresponding movement of a cutting tool attached to the end of the block member as, for example, by means of bolts extending into the apertures 142 in a known manner. In this manner, cutting inserts coupled to such a cutting tool will be caused to also flex in a radial direction relative to the axis 4. By controlling the speed and rotational direction of motor shaft 72, the cutting inserts can be caused to flex towards and away from a workpiece as quickly and to the extent desired.

The actual cutting operation results from rotation of the workpiece relative to the cutting tool in a known manner. For example, a cutting machine which may incorporate the machine tool of the present invention is depicted in FIG. 5. FIG. 5 depicts a cutting machine 200 generally of the type described in U.S. Pat. No. 3,740,161. Such a cutting machine involves rotation of the cutting insert relative to a non-rotating workpiece. For purposes of the present invention, the machine described in U.S. Pat. No. 3,740,161 is depicted in FIG. 5 as having been modified by attaching a workpiece 202 to a rotatable shaft 204 and positioning a machine tool 2 of the type described herein on table 206 in place of the tool holder and gauging equipment discussed in this patent. The use of such modified equipment provides a rotatable workpiece and stationary cutting tool. Movement of the machinery 208 in the direction of arrows 210 allows the workpiece to be moved towards and away from the cutting tool 6 which is coupled to the block member 10 of the machine tool 2. As already discussed herein, the block member 10 having the cutting tool coupled thereto is, caused to move radially so that the cutting edge of the tool engages and disengages the workpiece as the workpiece is rotated by shaft 204 in a known manner.

In the apparatus described herein the motor housed by housing 70 preferably comprises a stepper motor drive apparatus of the type described in U.S. Pat. No. 4,223,260 and made by GTE Valeron Corporation. In a like manner, a controller of the type described in U.S. Pat. No. 4,268,783 and also made by GTE Valeron Corporation can be used. However, the use of such a stepper motor and controller is by way of example only.

Although in the examples described herein the roller screw includes at least one nut body operatively coupled to the leadscrew spindle by inner and outer threads of the nut body and leadscrew spindle, respectively, such structure is by way of example only. Roller screws are well known in the art, and any type of roller screw which translates rotary motion into reciprocating motion may be engineered for use with the present invention. Examples, without limitation, include roller screws of the type sold by Nutec Components, Inc. under the trademark ROLLSCREW and roller screws of the type sold by Gewindle Satelliten Antriebe AG.

The machine tool of the present invention can be used in a closed loop system if desired. For example, in the apparatus of FIG. 1, the motor represents a stepper motor coupled to an encoder 150. The motor and encoder are shown schematically as being coupled to a controller 152, as, for example, a controller of the type disclosed in U.S. Pat. No. 4,268,783. Such combined structure is useful in assuring predetermined precision radial movement of cutting inserts as described herein. The use of an encoder in cutting applications is known in the art and will not be discussed further. However, it is noted that a useful encoder is available through PMI Motors, a division of Kollmorgen Corporation.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A machine tool holder circumscribing a longitudinal axis of rotation and adapted for having coupled thereto at least one cutting tool which is adjustable radially of said axis, said machine tool being of the type wherein said at least one cutting tool cuts a rotating workpiece and comprising:
   a housing circumscribing said axis;
   a block member having a cavity therein, circumscribing said axis and being coupled to said housing for radial movement relative to said axis, said block member being adapted for having coupled thereto said at least one cutting tool;
   a drawbar which extends along said axis and is reciprocatably mounted within said housing and said cavity;
   a roller screw mounted within said housing, said screw including a leadscrew spindle extending along said axis and at least one nut body operatively coupled thereto;
   means coupling said drawbar to said leadscrew spindle for reciprocating said drawbar along said axis when said leadscrew spindle moves along said axis;
   means operatively coupling said drawbar and said block member for causing said radial movement of said block member when said leadscrew spindle moves along said axis; and,
   means coupled to said at least one nut body for controllably rotating said at least one nut body to allow for the selective longitudinal movement along said axis of said leadscrew spindle and drawbar coupled thereto so that fine adjustments can be made in radially positioning said block member during a cutting operation.

2. The machine tool of claim 1 wherein said operatively coupling means includes a camming surface on a portion of said drawbar extending into said cavity and a cam follower extending between said block member and said camming surface.

3. The machine tool of claim 2 including a sleeve internal of and extending between said housing and said cavity, and wherein said drawbar reciprocates within said sleeve, said sleeve including an aperture therethrough adjacent said camming surface, and further wherein said cam follower includes a ball extending from said block member through said aperture and engaging said camming surface.

4. The machine tool of claim 3 wherein said ball includes a flat segment which engages said camming surface.

5. The machine tool of claim 4 further including means coupled between said drawbar and said sleeve for keying said drawbar relative to said sleeve.

6. The machine tool of claim 5 wherein said block member includes a first bore extending inwardly from an outer surface of said block member and a second bore extending outwardly from said cavity and intersecting said first bore and being in alignment with said aperture, further including a first pin which extends within said first bore and a second pin which extends within said second bore, said second pin having a first end which extends into said first bore and a second end which engages said ball, and said first pin having a first end which engages said first and of said second pin and a second end, and further including means extending into said first bore and engaging said second end of said first pin for urging said first pin against said second pin.

7. The machine tool of claim 6 wherein said first end of said first pin includes a first beveled surface and wherein said first end of said second pin includes a second beveled surface, said first beveled surface engaging said second beveled surface.

8. The machine tool of claim 7 wherein said controllably rotating means comprises a motor, said motor including a motor housing and a motor shaft and having means attached thereto for operatively affixing said nut body to said motor.

9. The machine tool of claim 8 wherein said operatively affixing means includes a roll screw housing having said at least one nut body internal thereof and affixed thereto, a dynamic spline adapter member affixed to said roll screw housing, and a harmonic drive member coupled to said motor and said adapter member.

10. The machine tool of claim 9 wherein said roll screw housing is internal of said machine tool housing and spaced therefrom for rotation relative thereto by at least one bearing member.

11. The machine tool of claim 10 wherein said harmonic drive member includes a stationary first portion coupled to said motor housing and a rotatable second portion affixed to said motor shaft and to said adapter.

12. The machine tool of claim 3 wherein said block member is a U-shaped structure having a first wall spaced from a second wall, said first and second walls being joined by a base, and wherein said machine tool housing includes an end portion which extends into said U-shaped structure between said walls, said walls being coupled to said end portion.

13. The machine tool of claim 12 wherein said base includes said cavity and wherein said sleeve is internal of and extends between said end portion and base.

14. A cutting machine comprising:
a workpiece holder;
means attached to said holder for rotating said holder about a longitudinal axis of rotation;
a machine tool holder circumscribing said axis and adapted for having coupled thereto at least one cutting tool which is adjustable radially of said axis such that a cutting edge of said cutting tool is caused to engage and disengage said workpiece, said machine tool comprising:
a housing circumscribing said axis;
a block member having a cavity therein, circumscribing said axis and being coupled to said housing for radial movement relative to said axis, said block member being adapted for having coupled thereto said at least one cutting tool;
a drawbar which extends along said axis and is reciprocatably mounted within said housing and said cavity;
a roller screw mounted within said housing, said screw including a leadscrew spindle extending along said axis and at least one nut body operatively coupled thereto;
means coupling said drawbar to said leadscrew spindle for reciprocating said drawbar along said axis when said leadscrew spindle moves along said axis;
means operatively coupling said drawbar and said block member for causing said radial movement of said block member when said leadscrew spindle moves along said axis; and,
means coupled to said at least one nut body for controllably rotating said at least one nut body to allow for the selective longitudinal movement along said axis of said leadscrew spindle and drawbar coupled thereto so that fine adjustments can be made in radially positioning said block member during a cutting operation.

15. The apparatus of claim 1 wherein said nut body rotating means is a motor.

16. The apparatus of claim 15 wherein said motor is a stepper motor.

17. The apparatus of claim 16 wherein said motor is coupled to a controller mechanism.

18. The apparatus of claim 17 wherein an encoder is coupled to said controller mechanism and said motor.

19. A machine tool circumscribing a longitudinal axis of rotation and adapted for having coupled thereto at least one cutting tool which is adjustable radially of said axis, said machine tool being of the type wherein said at least one cutting tool cuts a rotating workpiece and comprising:
a housing circumscribing said axis;
a block member having a cavity therein, circumscribing said axis and being coupled to said housing for radial movement relative to said axis, said block member being adapted for having coupled thereto said at least one cutting tool;
a drawbar which extends along said axis and is reciprocatably mounted within said housing and said cavity;
a roller screw mounted within said housing, said screw including a landscrew spindle extending along said axis and at least one nut body operatively coupled thereto, said roller screw being so mounted that rotary motion of said at least one nut body about said axis causes movement of said leadscrew spindle along said axis;
means coupled to said at least one nut body for controllably rotating said at least one nut body;
means coupling said drawbar to said leadscrew spindle for reciprocating said drawbar along said axis in response to movement of said leadscrew spindle along said axis; and,
means operatively coupling said drawbar and said block member for causing said radial movement of said block member in response to reciprocation of said drawbar, said operatively coupling means including a camming surface on a portion of said drawbar extending into said cavity and a cam follower extending between said block member and said camming surface, and further including a sleeve internal of and extending between said housing and said cavity, and wherein said drawbar reciprocates within said sleeve, said sleeve including an aperture therethrough adjacent said camming surface, and further wherein said cam follower includes a ball extending from said block member through said aperture and engaging said camming surface.

20. A cutting machine comprising;
a workpiece holder;
means attached to said holder for rotating said holder about a longitudinal axis of rotation;
a machine tool circumscribing said axis and adapted for having coupled thereto at least one cutting tool which is adjustable radially of said axis such that a cutting edge of said cutting tool is caused to engage and disengage said workpiece, said machine tool comprising:
a housing circumscribing said axis;
a block member having a cavity therein, circumscribing said axis and being coupled to said housing for radial movement relative to said axis, said block member being adapted for having coupled thereto said at least one cutting tool;
a drawbar which extends along said axis and is reciprocatably mounted within said housing and said cavity;
a roller screw mounted within said housing, said screw including a leadscrew spindle extending along said axis and at least one nut body operatively coupled thereto, said roller screw being so mounted that rotary motion of said at least one nut body about said axis causes movement of said leadscrew spindle along said axis;
means coupled to said at least one nut body for controllably rotating said at least one nut body;
means coupling said drawbar to said leadscrew spindle for reciprocating said drawbar along said axis in response to movement of said leadscrew spindle along said axis; and,
means operatively coupling said drawbar and said block member for causing said radial movement of said block member in response to reciprocation of said drawbar, said operatively coupling means including a camming surface on a portion of said drawbar extending into said cavity and a cam follower extending between said block member and said camming surface, and further including a sleeve internal of and extending between said housing and said cavity, and wherein said drawbar reciprocates within said sleeve, said sleeve including an aperture therethrough adjacent said camming surface, and further wherein said cam follower includes a ball extending from said block member through said aperture and engaging said camming surface.

* * * * *